(12) United States Patent
Burke

(10) Patent No.: US 6,527,194 B1
(45) Date of Patent: Mar. 4, 2003

(54) FLOW CONTROL DAMPER

(76) Inventor: Donald Burke, 9291 Hilo Farm Dr., Kirtland Hills, OH (US) 44060

( * ) Notice: Subject to any disclaimer, the term of this patent is extended or adjusted under 35 U.S.C. 154(b) by 0 days.

(21) Appl. No.: 09/680,794

(22) Filed: Oct. 6, 2000

(51) Int. Cl.[7] ............................................. F24F 11/053
(52) U.S. Cl. ............................... 236/49.3; 137/625.32; 137/625.38; 454/334
(58) Field of Search ................................ 454/323, 334; 137/625.38, 625.33, 625.32; 236/49.3

(56) References Cited

U.S. PATENT DOCUMENTS

| | | | |
|---|---|---|---|
| 80,509 A | * | 7/1868 | Sanderson |
| 117,853 A | * | 8/1871 | Allen ..................... 137/625.32 |
| 919,508 A | * | 4/1909 | Williams ............... 137/625.32 |
| 2,009,967 A | | 7/1935 | Dahnke |
| 3,083,733 A | * | 4/1963 | Rust ....................... 137/625.38 |
| 3,180,363 A | | 4/1965 | Knarbakk |
| 3,369,567 A | * | 2/1968 | Larkfeldt et al. |
| 3,561,487 A | * | 2/1971 | Reed, Jr. ............... 137/625.32 |
| 3,911,958 A | | 10/1975 | Logsdon |
| 3,958,605 A | | 5/1976 | Nishizu et al. |
| 4,431,028 A | | 2/1984 | Hendrick |
| 4,516,606 A | | 5/1985 | Worley |
| 4,633,900 A | | 1/1987 | Suzuki |
| 4,796,803 A | * | 1/1989 | Kelley |
| 4,803,931 A | | 2/1989 | Carson |
| 5,333,835 A | * | 8/1994 | Smith et al. |
| 5,402,821 A | | 4/1995 | Harstad |

* cited by examiner

*Primary Examiner*—Harold Joyce
(74) *Attorney, Agent, or Firm*—Renner, Otto, Boisselle & Sklar, LLP

(57) ABSTRACT

A damper including a pair of damper members movable with respect to each other is disclosed. Each damper member has at least one wall correspondingly inclined to an axis of the damper. The inclined walls are relatively movable between open and closed positions. The walls include plural apertures separated by imperforate portions. The apertures in each wall are disposed such that the apertures of one of the damper members are at least partially blocked by the imperforate portions of the other damper member when the inclined walls are in the closed position.

36 Claims, 4 Drawing Sheets

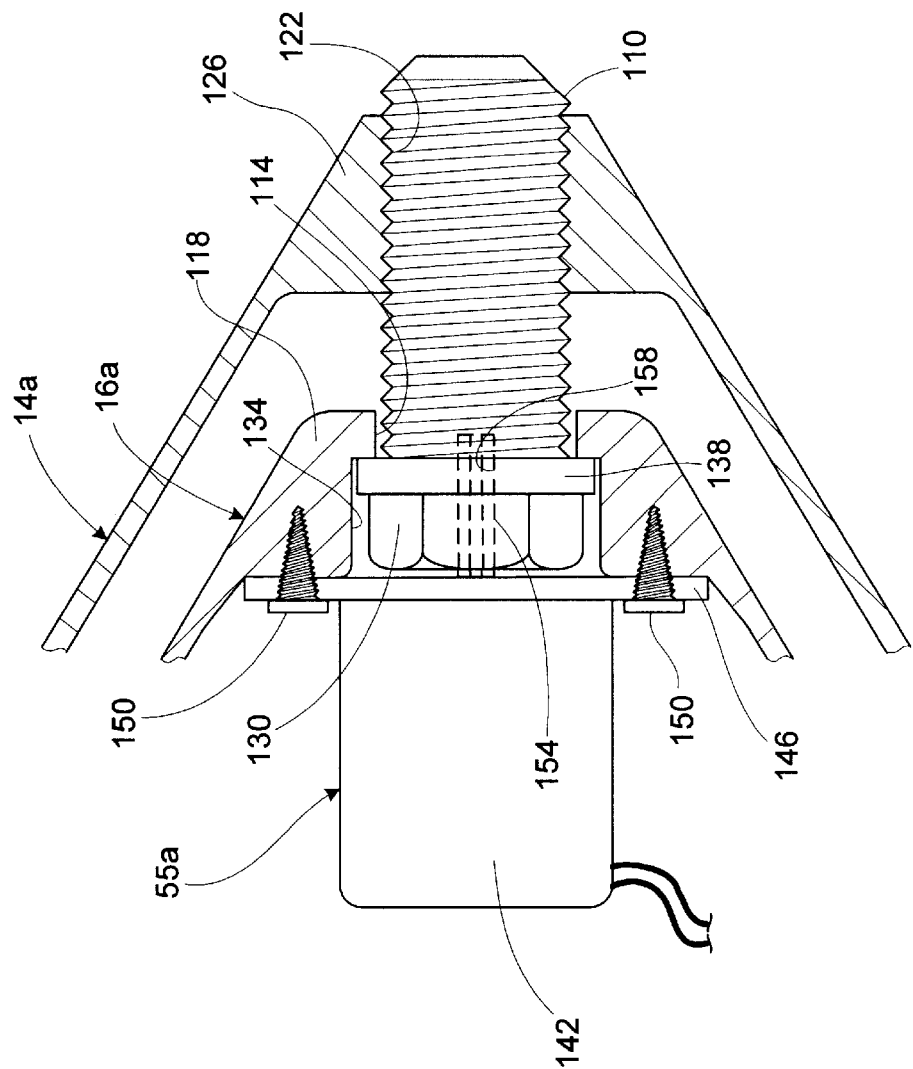
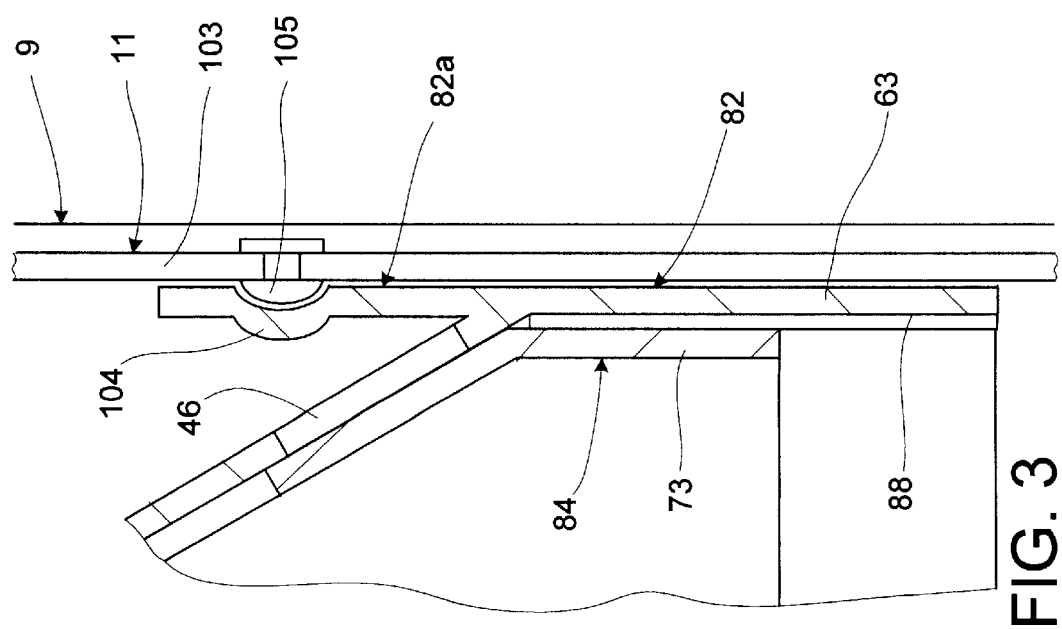
FIG. 4
FIG. 3

FLOW CONTROL DAMPER

FIELD OF THE INVENTION

The present invention relates to a flow control damper and, more particularly, a flow control damper that includes converging portions movable relative to one another to control flow through a conduit such as an HVAC duct.

BACKGROUND

Various types of dampers heretofore have been used to regulate the rate of air flow through a heating, ventilating and air conditioning (HVAC) duct. Although these prior art dampers have generally performed in a satisfactory manner, some still suffer from various problems. For example, some dampers generate an undesirable amount of noise when in a throttle position or suffer from flutter and instability at their set point adjustment. Some single and multiple blade dampers are difficult to consistently lock at a fixed set point.

Some known dampers may adversely affect the efficiency and/or performance of an HVAC system not only because of their particular structure but also because of the manner in which they are installed. For example, some multiple blade dampers require a complicated support structure that fits inside a duct and interferes with the flow of air through the duct, thereby reducing the volumetric flow rate and/or interfering with the optimal flow path through the duct. Also, some dampers used as power roof ventilator (PRV) backdraft dampers in conjunction with a fan have been known to interrupt the flow pattern into the PRV and thereby deleteriously affect the performance of the fan.

When dampers are installed at the outlets of a duct near diffusers and/or grilles, the flow pattern through the diffusers and/or grilles is disrupted. In some applications, it is necessary to install at least two dampers in series, one in line in the duct remote from an outlet or inlet, and the other at an outlet and/or inlet of the duct. The requirement for two dampers is economically undesirable and creates an inconvenience to install.

When dampers are installed in ceilings, an access door or removal of one or more ceiling tiles may be required to give access to the damper for adjustment. Access doors create additional expense and may be obtrusive. Removing and replacing ceiling tiles is inconvenient and may result in damage to a ceiling tile, resulting in a less attractive ceiling.

SUMMARY OF THE INVENTION

The inventor of the present invention appreciated the need for a damper overcoming one or more of the aforesaid drawbacks associated with prior art dampers; for example, a damper that would generate less noise in a position near the outlet or inlet of a duct or more remote from the desired destination of air flow, would not flutter or deviate from its set point adjustment, would improve the flow pattern, would provide regulation of a high percentage of the transverse cross sectional area of a duct, would be adjustable from a terminal outlet or inlet to avoid the need for ceiling space access; and/or would replace the need for both an in-line damper and an inlet/outlet damper.

According to a general aspect of the invention, a damper includes a pair of damper members movable with respect to each other. Each damper member has at least one wall correspondingly inclined to an axis of the damper and the inclined walls are relatively movable between open and closed positions. The walls include plural apertures separated by imperforate portions, and the apertures in each wall are disposed such that the apertures of the inclined wall of one of the damper members are at least partially blocked by the imperforate portions of the inclined wall of the other damper member when the inclined walls are in the closed position.

In an embodiment of the invention, the damper members have a funnel shape. The funnel shape damper members may be sized so that one of the funnel shape damper members may be disposed substantially inwardly of the other funnel shape damper member. To facilitate the relative movement between the damper members, the inner damper member may be mounted telescopically within the outer member along the axis of the damper. In such case, the degree to which the inner and outer damper members are axially displaced and the degree to which the apertures thereof are in registry is determinative of the amount of air flow through the damper.

In an embodiment of the invention, the damper may further include inner and outer skirt portions connected to the respective inner and outer damper members. The outer skirt portion facilitates guiding the movement of the inner skirt portion to maintain the respective inner and outer damper members in coaxial and telescoping relationship when the damper members are moved relative to one another axially along the axis of the damper.

In an embodiment of the invention, the funnel shape damper members are arranged for relative movement rotationally about the axis of the damper. In such embodiment, the degree to which the inner and outer damper members are angularly displaced and the degree to which the apertures thereof are in registry is determinative of the amount of air flow through the damper. Also, in such embodiment skirt portions may be connected to the respective inner and outer damper members. Here, the outer skirt portion guides the movement of the inner skirt portion when the damper members are moved relative to one another rotationally about the axis.

In an embodiment of the invention, the outer skirt portion is sized to closely fit into a duct such as an HVAC duct. The outer skirt portion is secured into engagement with the duct by means of, for example, a snap-in technique. More particularly, in accordance with an embodiment of the invention, the duct includes an annular bead and the outer skirt portion includes one or more nodules which snap into the bead when the outer skirt portion is inserted into the first duct. The damper and duct may together form a damper assembly which may further be installed into an existing duct having a slightly larger cross section than that of the duct in which the damper is inserted. The damper assembly may be secured to the existing duct by means of a sheet metal screw or, if the existing duct is a flexible duct, by means of friction between the two ducts.

In an embodiment of the invention, the apertures of the respective damper members are arranged in matching patterns. The shape of the apertures of the respective damper members may be any suitable shape, for example, circular. Also, the apertures of one damper member may be substantially similar in shape as the apertures of the other damper member. In an exemplary embodiment, the apertures are sized and arranged so that when the damper members are in the open position, the apertures align in a direction substantially perpendicular to the wall(s) of each damper member. Such an arrangement provide substantially unimpeded flow through the damper.

In an embodiment of the invention, the wall(s) of the respective damper members form a frustopyramidal shaped damper.

In an embodiment of the invention, the wall(s) of the respective damper members form frustoconical shaped damper members. In such embodiment, the axis of the damper is coincident with the center axes of the frustoconical shaped damper members. Such damper members may be operative to relatively move rotationally about or axially along the axis.

In an embodiment of the invention, the closed position of the damper members constitutes the apertures of one damper member being fully blocked by the imperforate portions of the other damper member. To this end, the imperforate portions may be made larger than the apertures to provide tolerance in a shut-off condition of the damper.

In an embodiment of the invention, the axis of the damper is defined by a direction of flow through the damper and the damper members are relatively movable axially along the axis. In such a damper, the degree to which the at least one walls of the respective damper members are axially displaced and the degree to which the apertures thereof are in registry is determinative of the amount of air flow through the damper. The damper may include an actuating assembly for relatively moving the damper members axially along the axis. To accomplish this, the actuating assembly may include a drive member for linearly reciprocating one damper member relative to another damper member along the axis. A motive source such as a motor may be used for moving the drive member. The motive source may be positioned proximate to the drive member or, alternatively, remote from the drive member and connected thereto by a cable-sleeve assembly.

In an embodiment of the invention, the damper includes a controller for controlling the relative movement between the damper members. The damper may also include a temperature sensor for detecting temperature of a space into which the damper conveys air and The controller may control the relative movement between the damper members based on a sensed temperature in a room and/or based on the pressure drop across the damper.

The foregoing and other features of the invention are hereinafter more fully described and particularly pointed out in the claims, the following description and the annexed drawings setting forth in detail illustrative embodiments of the invention, such being indicative, however, of but a few of the various ways in which the principles of the invention may be employed.

BRIEF DESCRIPTION OF THE DRAWINGS

FIG. 3 is a broken cross section view of a damper in accordance with an embodiment of the invention, showing a snap-in means of connecting the damper in a duct.

FIG. 4 is a broken cross section view of a damper in accordance with an embodiment of the invention, the damper including a threaded screw actuating assembly.

DETAILED DESCRIPTION

Figure 1:
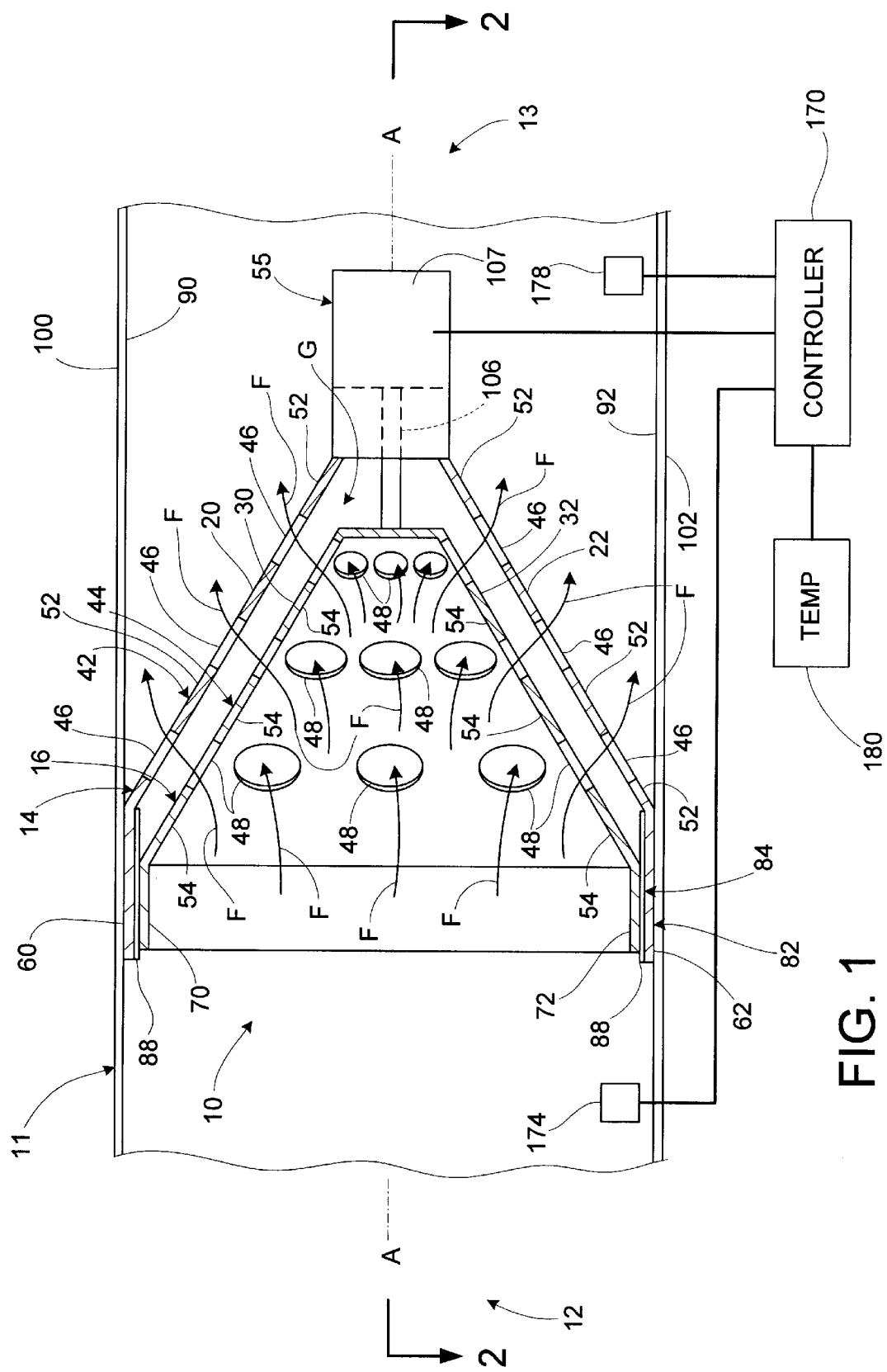
FIG. 1 is a cross sectional view of a damper in accordance with the present invention, the damper being shown in an open position and disposed in a duct.
Figure 2:
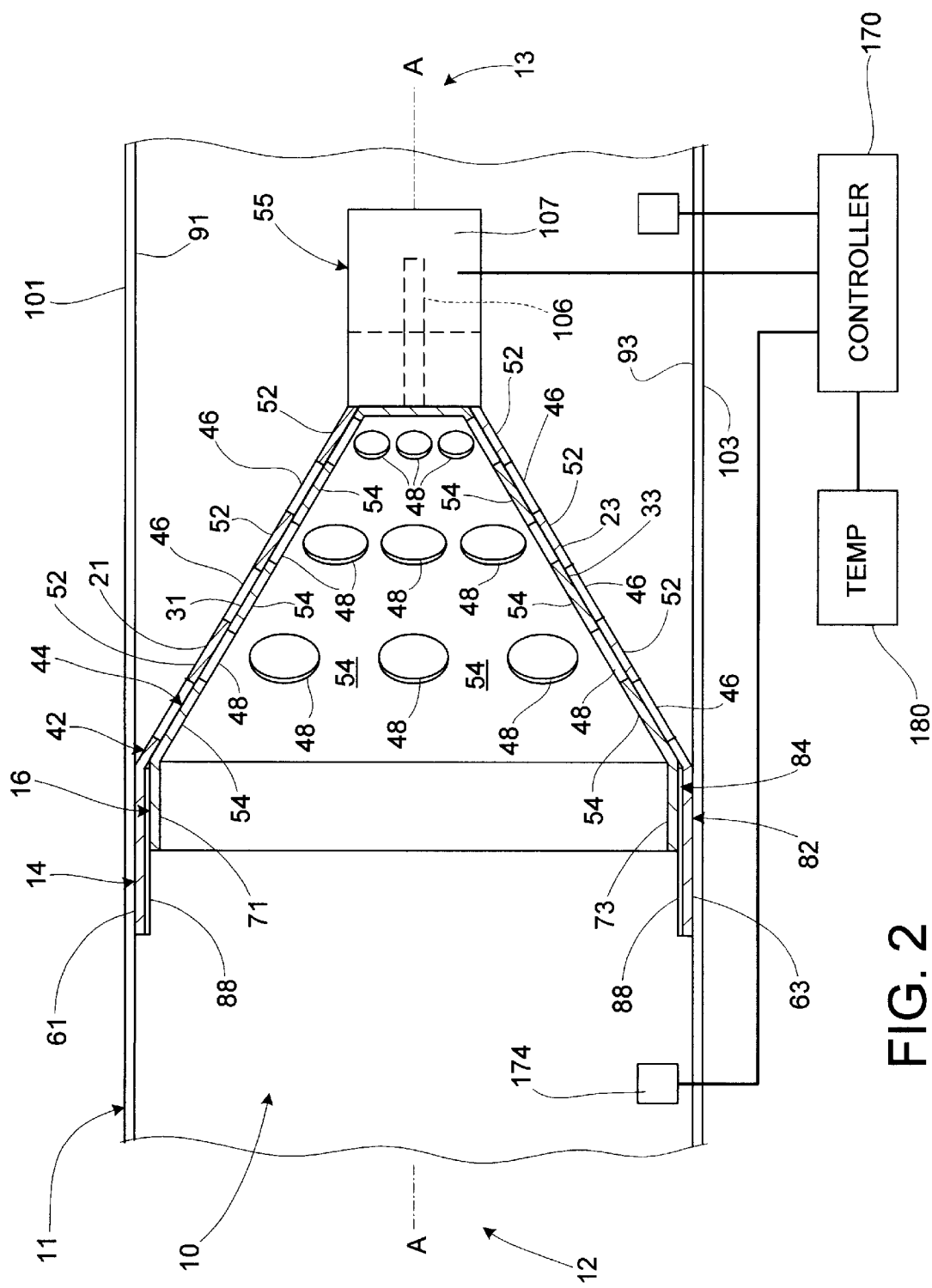
FIG. 2 is a view similar to FIG. 1 showing the damper in a closed position.

Referring now in detail to the drawings, FIGS. 1 and 2 show a flow control damper 10 according to the present invention, the damper 10 being shown disposed in an HVAC duct 11. Because the invention was conceived and developed in the context of an HVAC system, it is described herein chiefly in such context. However, the underlying principles of the invention could be adapted to other flow control apparatuses with advantageous results. Also, the air flow through the duct 11 is indicated by arrows F in the several figures, although the illustrated air flow (i.e., left to right in FIG. 1) is only to facilitate the description of the present invention as herein described. An air flow from right to left is also contemplated by the present invention.

The damper 10 includes a pair of damper members 14 and 16 made of metal although the damper members may be made of plastic or other suitable material for a given application. As is further discussed below, the damper member 16 is telescopically movable within the damper member 14 along an axis A—A between an axially displaced (open) position (FIG. 1) and an axially juxtaposed (closed) position (FIG. 2).

The illustrated damper members 14 and 16 include, respectively, four axially extending converging side walls 20–23 and 30–33, which collectively form respective frustopyramidal sections 42 and 44. Although a frustopyramidal shape is desirable, the converging walls (or even a single inclined wall) may be otherwise configured, for example, to form a three-sided pyramidal shape or a conical shape. As is further discussed below, the use of an inclined wall(s) provides greater surface area than the cross sectional area of the duct 11 with which to regulate air flow. Also, it has been found that a frustoconical or frustopyramidal shape damper tends to even out the air flow to produce a more uniform velocity profile downstream of the damper 10; this being advantageous over some known blade type dampers which tend to disrupt a uniform velocity profile resulting in less even flow downstream of the damper.

Also contemplated are wedge shaped damper members or parallel inclined wall damper members which may be axially moved relative to one another in accordance with the present invention to achieve variable flow rate thereby.

The converging side walls 20–23 and 30–33 include, respectively, plural apertures 46 and 48, separated by imperforate portions 52 and 54. The apertures 46 of the damper member 14 preferably match the shape, size and arrangement of the apertures 48 of damper member 16. In addition, the apertures 46 of the damper member 14 may be uniformly spaced apart, as may the apertures 48 of the damper member 16. Also, apertures in opposing converging side walls (for example, apertures 46 in side wall 20 and apertures 46 in opposing side wall 22) may be similarly arranged.

The apertures 46 and 48 are arranged in the damper members 14 and 16 so that when the damper members 14 and 16 are juxtaposed in the closed position thereof, the apertures 46 and 48 in each damper member 14 and 16 are at least partially blocked by the imperforate wall portions 52 and 54 between the apertures 46 and 48 in the other damper members 14 and 16. In most instances, it will be desirable to provide for complete blockage to totally shut-off flow through the duct 11 when the damper 10 is closed. To this end, the imperforate portions 52 and 54 may be slightly larger than the apertures 46 and 48 to permit tolerance in a shut-off condition. However, if leakage or partial flow is desired in the closed position of the damper 10, then the apertures 46 and 48 may be configured such that they are only partially blocked in the closed position of the damper 10.

When the damper members 14 and 16 are axially moved apart, flow through the damper will progressively increase.

In the full open position, corresponding apertures 46 and 48 in the damper members 14 and 16 may align with one another in a direction perpendicular to the walls 20–23 and 30–33, respectively, in which the apertures 46 and 48 are located to provide substantially unimpeded flow. If desired, the damper members 14 and 16 may be further moved apart to make flow through the damper 10 more linear and thus provide even less impedement or disruption of flow.

Although in the illustrated embodiment the apertures 46 and 48 are circular in shape, any shape, for example, a rectangular or diamond shape may also be suitable. Also, the as shown apertures 46 and 48 are progressively larger going from the downstream end to the upstream end of the damper members 14 and 16. The shape and size, as well as the number and arrangement of the apertures 46 and 48 will depend on, for example, the desired variable flow rate to be achieved by the damper 10 in its open or closed positions. For example, in an open position it may be desirable that the total open area provided by the apertures 46 and 48 be greater than or at least about equal to the cross sectional area of the duct 11. In this way air flow through the duct 11 may be maximized. Generally a relatively larger size or number (and accordingly greater density) of apertures 46 and 48 will produce a higher flow rate and, conversely, a relatively smaller size or number (and accordingly lower density) of apertures 46 and 48 will produce a lower flow rate. As was mentioned above, the use of inclined, or converging, side walls provides greater surface area than the cross sectional area, or base area, of the duct 11 with which to regulate air flow. In the illustrated embodiment, the total surface area of the converging side walls 20–23 or 30–33 is at least about 200% of the base area of the duct 11 thereby enabling the apertures 46 and 48 to have a collective area about equal to or greater than the cross-sectional area of the duct 11.

At their upstream end, the converging side walls 20–23 and 30–33 are connected to respective skirt walls 60–63 and 70–73 which collectively form respective rectangular shaped skirt portions 82 and 84. The skirt portion 84 and the aforementioned frustopyramidal section 44 of the damper member 16 are slightly smaller in cross section than the skirt portion 82 and frustopyramidal section 42 of the damper member 14. This enables the damper members 14 and 16 to move telescopically relative to one another with the skirt portions 82 and 84 serving to maintain the damper members 14 and 16 coaxial. A rectangular shaped sleeve bearing 88 made of, for example, PTFE, is preferably disposed between the respective skirt portions 82 and 84 to facilitate the relative axial guiding movement between the damper members 14 and 16. This configuration of the damper members 14 and 16 and particularly the skirt portions 82 and 84 is advantageous as the usually movable inner damper member 16 will be guided in the movement direction by the outer damper member 12, without any need for hinges, pivot pins or the like.

The skirt portion 82 of the damper member 14 is sized to closely fit inside the duct 11 and is secured to the duct walls 100–103 by suitable means, such as by an adhesive or a sheet metal screw. Alternatively, as shown in FIG. 3, a snap-in technique may be used, wherein an extended skirt portion 82a is secured to the skirt portion 82. The extended skirt portion 82a includes an annular detent, or bead 104 which mates with one or more corresponding nodules 105 in the duct 11, the nodules in the illustrated embodiment being formed by the heads of rivets. As the extended skirt portion 82a is inserted into the duct 11, the nodule(s) 105 fit into the detent 104 to securely engage the extended skirt portion 82a with the duct 11.

It is noted that, in an alternative embodiment, the damper 10 may be installed in the duct 11 and the combination of the damper 10 and duct 11, in turn, installed into an existing duct having a slightly larger cross section than that of the duct 11. See, for example, FIG. 3, showing such slightly larger duct 9. The duct 11 may be secured to the larger duct by, for example, a sheet metal screw. Alternatively, the combination of the damper 10 and duct 11 may be installed into a flexible duct, in which case the friction between the duct 11 and the flexible duct may hold the combination in the flexible duct. In a further arrangement, duct 11 may be spliced into an existing duct run.

An actuating assembly 55 is mounted to the apex of the damper member 14. Alternatively, the actuating assembly 55 may be mounted internally of the damper member 16, for example, as described below with reference to FIG. 4. The actuating assembly 55 may comprise any type of actuating assembly that provides linear actuation, for example, a threaded screw actuating assembly, a cable-sleeve actuating assembly, a solenoid valve actuating assembly, or a pneumatic or hydraulic piston-cylinder actuating assembly. Preferably, actuation is via a threaded screw actuating assembly, as such an assembly enables the actuating assembly 55 to hold its set point. The actuating assembly 55 may include manual adjusting means or suitable motive power means, such as an electric motor. As is described in greater detail below, the actuating assembly may be controlled via instruction from, for example, a controller. Also, control of the actuating assembly 55 may be from a position remote from the actuating assembly 55. For example, for the cable-sleeve actuating assembly, cable may be routed from the assembly to a position remote from the actuating assembly and, for the motor driven assembly, electrical wires may be extended from the motor to a motor control device remote from the motor.

The actuating assembly 55 shown in FIGS. 1–2 includes a housing secured to the damper member 14 and a drive member 106 connected to the apex of the damper member 16. The actuating assembly 55 includes a motor 107 which is operative to linearly reciprocate the drive member 106 which, in turn, reciprocates the damper member 16 to and from within the damper member 14 along the axis A—A between the open and closed positions.

As was previously mentioned, actuation is preferably by a threaded screw actuating assembly. Such an assembly is shown, for example, in FIG. 4 at reference numeral 55a. In this embodiment, the actuating assembly 55a is installed in damper members 14a and 16a constructed of a PVC material. The actuating assembly 55a includes a threaded drive member 110 which, when rotated, effects relative translating movement of damper members 14a and 16a. The threaded drive member 110 preferably is a PVC coarse thread screw which extends through an opening 114 in an end wall 118 of the damper member 16a and threadedly engages a correspondingly threaded opening 122 extending through an end wall 126 of the damper member 14a. The screw pitch of the threaded drive member 110 is set preferably so as to be self-locking. The head 130 of the threaded drive member 110 is seated within a recessed portion 134 of the end wall 118 and a nylon washer 138 is disposed beneath the head 130 to facilitate substantially friction free movement between the threaded drive member 110 and the end wall 114. The actuating assembly 55a includes an electric rotary motor 142 which is mounted to the end wall 118 for incrementally rotatably driving the threaded drive member 110. The housing of the motor 142 includes a retaining plate 146 which axially retains the head 130 of the threaded drive member 110 in the recessed portion 134. The retaining plate 146 is secured to the end wall 118 by fasteners 150 or other means. Extending from the motor 142 is a spline 154 which is sized and keyed to mate with a correspondingly sized opening 158 in the head 130 of the threaded drive member 110. In operation, the motor 142 incrementally rotates the spline 154 which, in turn, incrementally rotates the threaded drive member 110. The incremental rotation of the threaded drive member 110 causes translating movement and therefore linear actuation of the damper member 16a relative to the damper member 14a. Using a threaded screw actuating assembly 55a substantially prevents the adjustment set point of the damper member 16a relative to the damper member 14a from changing due to, for example, air velocity or pressure forces. In this regard, the threaded screw actuating assembly 55a is advantageous over, for example, blade type dampers requiring a locking mechanism to hold the damper in its set point.

Referring again to FIGS. 1–2, by linearly reciprocating the drive member 106, the actuating assembly 55 enlarges and reduces the size of the gap G by displacing and moving into juxtaposition the converging side walls 30–33 relative to the converging side walls 20–23. In so doing, the apertures 46 and 48 in the respective side walls 20–23 and 30–33 are moved into and out of registry with respect to each other in the below discussed manner.

It will be appreciated that the extent to which the axial spacing G is adjusted between the frustopyramidal sections 42 and 44, and the degree to which the apertures 46 and 48 of the respective damper members 14 and 16 are in registry, determines the amount of flow through the damper 10 for a given pressure differential. Referring to FIG. 1, the actuating assembly 55 may be operated to move the damper member 16 axially to a full open position with the apertures 48 of the damper member 16 being brought into full and coincidental registry with corresponding apertures 46 of the damper member 14. In full registry the apertures 46 and 48 of the respective damper members 14 and 16 align in a direction perpendicular to the respective converging side walls 20–23 and 30–33 thereof. In this position, the damper 10 permits essentially unimpeded flow F through the apertures 48 of the damper member 16, across the gap G and through the apertures 46 of the damper member 14.

In FIG. 2, the actuating assembly 55 has retracted the drive member 106 from the position shown in FIG. 1, whereby the damper member 16 is in axial juxtaposition with the damper member 14. As a result, the gap G is closed, the apertures 48 of the damper member 16 are brought into alignment with the imperforate portions 52 of the damper member 14, and the apertures 46 of the damper member 14 are brought into alignment with the imperforate portions 54 of damper member 16. In other words, the apertures 46 and 48 are not in registry with one another. In this position, flow through the damper 10 is prevented or substantially impeded.

Of course, the drive member 106 may be extended or retracted to other positions to alter the size of the gap G between the frustopyramidal sections 42 and 44 of the respective damper members 14 and 16 and to move the respective apertures 46 and 48 thereof into varying degrees of partial registry. In this regard, it will be appreciated that the damper 10 enables variation in the flow rate through the damper 10 by varying the extent of reciprocation of the drive member 106.

As was mentioned above, the actuating assembly 55, and thus the flow through the damper 10, may be controlled by a controller, generally indicated by the reference numeral 170. One way of accomplishing this is to correlate the velocity of the air through the duct 11 with the actuation of the actuating assembly 55 or, more particularly, the extent of reciprocation of the drive member 106. The velocity of the air flow through the duct 11 may be measured by, for example, measuring the pressure drop across the duct 11 via sensors 174 and 178 and calculating the velocity therefrom, or by other means. The controller 170 correlates the velocity with predetermined positions between the open position (FIG. 1) and closed position (FIG. 2) of the damper 10. Thus, based on the sensed pressure drop across the duct 11 the controller 170 may be used to achieve a desired velocity through the damper 10 by adjusting the actuating assembly 55, and therefore the drive member 106, to the appropriate corresponding position. Such a system may be particularly useful, for example, in a variable air volume (VAV) terminal control unit. The damper 10 may also include a temperature sensor 180 to measure the temperature, for example, of a room into which flow from the damper 10 is conveyed. Based on changes in the sensed temperature, the controller 170 can increase or decrease flow via instructions to the actuating assembly 55.

Figure 5:
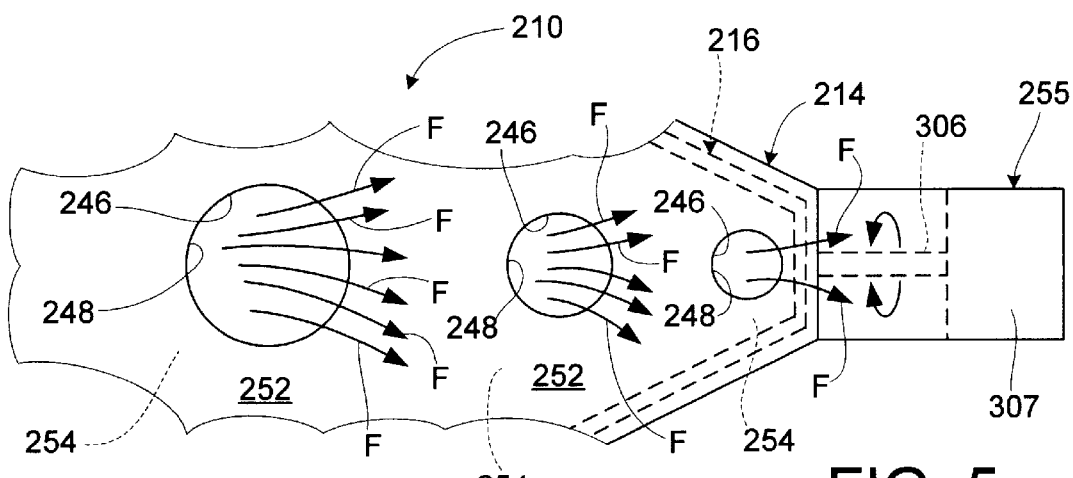
FIGS. 5–7 are partial views of another damper, the damper being shown in an open position, a partially open position and a closed position, respectively.
Figure 6:
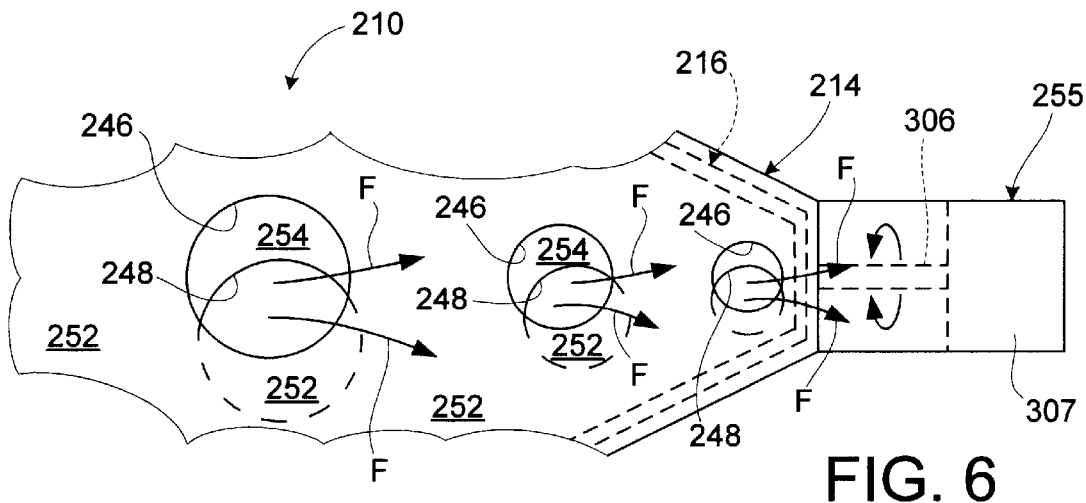
Figure 7:
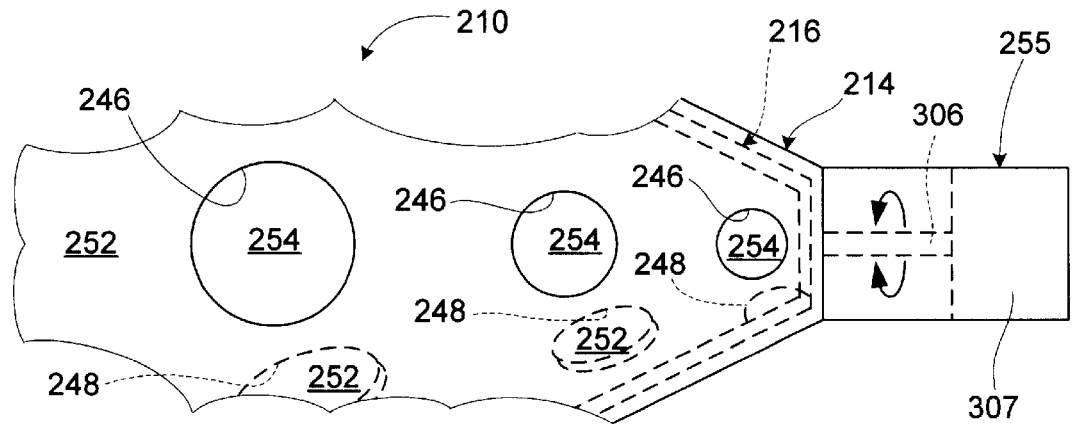

FIGS. 5–7 show another embodiment of a damper 210 according to the present invention wherein a pair of damper members 214 and 216 correspond in shape and size with respect to one another. Here, the shape of the damper members 214 and 216 is frustoconical, which enables the damper member 216 to freely rotate within the damper member 214. Like the damper members 14 and 16, the damper members 214 and 216 include respective apertures 246 and 248 separated by imperforate portions 252 and 254. The apertures 246 and 248 are moved into and out of registry by rotating the damper members 214 and 216 relative to one another between an angularly aligned position (FIG. 5) and an angularly displaced position (FIGS. 6 and 7).

A rotary actuating assembly 255 is secured to the apex end of the damper member 214 and includes a motor 307 which provides rotary movement to the damper member 216 by means of a drive member 306 connected to the apex of the damper member 216. In FIG. 5, the damper members 214 and 216 are shown in a full open position whereby the apertures 248 of the damper member 216 are in angular alignment, or in full and coincidental registry, with the apertures 246 of the damper member 214. Here, the damper 210 permits substantially unimpeded flow F through the apertures 246 and 248.

In FIG. 6, the damper members 214 and 216 are shown in a partially open position whereby the drive member 306 has rotated the damper member 216 so that the apertures 248 thereof are in partial registry with the apertures 246 of the damper member 214. Thus, the apertures 248 of the damper member 216 are partially blocked by the imperforate portions 252 of the damper member 214, and the apertures 268 of the damper member 216 are partially blocked by the imperforate portions 254 of the damper member 216.

In FIG. 7, the drive member 306 has rotated the damper member 216 to a full closed position with the apertures 248 of the damper member 216 fully blocked by the imperforate portions 252 of the damper member 214, and the apertures 268 of the damper member 216 fully blocked by the imperforate portions 254 of the damper member 216. In this position, flow through the damper 210 is prevented or at least substantially impeded. As before, the damper 210 may be configured to provide for only partial blockage of flow in its full closed position, if desired.

In the embodiment of FIGS. 5–7, the frustoconical shape damper members 214 and 216 are axially juxtaposed so that the amount of flow through the damper 210 is determined by the degree to which the apertures 246 and 248 of the respective damper members 214 and 216 are in registry. The present invention also contemplates a damper whereby an axial gap may be provided between frustoconical shaped damper members 214 and 216. The gap may be adjustable by providing means similar to that disclosed above in regard to the embodiment of FIGS. 1–2 so that the damper member 216 is also telescopically movable within the damper member 214.

Also, in the embodiment of FIGS. 5–7, the actuating assembly 255 may comprise any type of actuating assembly that provides rotary actuation, for example, as by means of a cable-sleeve actuating assembly. Also, like the above described actuating assembly 55, the actuating assembly 255 may include manual adjusting means or suitable motive power means, such as an electric motor. The actuating assembly may be controlled via instruction from a controller as described above with respect to the embodiment of FIGS. 1–2. Also, control of the actuating assembly 255 may be from a position remote from the actuating assembly 255.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A damper comprising: a pair of damper members movable in an axial direction with respect to each other between open and closed positions, the damper members having respective funnel shaped portions each including at least one wall correspondingly inclined to an axis of the damper, the inclined walls including plural apertures separated by imperforate portions, the apertures in each wall being disposed such that the apertures of the inclined wall of one of the damper members are at least partially blocked by the imperforate portions of the inclined wall of the other damper member when the damper members are in the closed position; and an actuating assembly connected to an apex of one of the damper members for moving the damper members relative to one another.

2. A damper as set forth in claim 1, wherein the pair of funnel shape damper members comprise inner and outer funnel shape damper members, the inner funnel shape damper member being disposed substantially inwardly of the outer funnel shape damper member.

3. A damper as set forth in claim 2, wherein the inner member is mounted for relative telescoping movement within the outer member axially along the axis of the damper.

4. A damper as set forth in claim 3, wherein axial displacement between the inner and outer damper members and the apertures provide a path for air flow through the damper, and wherein the degree to which the inner and outer damper members are axially displaced and the degree to which the apertures thereof are in registry determines an amount of air flow through the damper.

5. A damper as set forth in claim 3, further including inner and outer skirt portions connected to the respective inner and outer damper members, the outer skirt portion guiding the movement of the inner skirt portion to maintain the respective inner and outer damper members in coaxial relationship when the damper members are moved relative to one another axially along the axis of the damper.

6. A damper as set forth in claim 2, wherein the funnel shape damper members are relatively movable rotationally about the axis of the damper.

7. A damper as set forth in claim 6, wherein the degree to which the inner and outer damper members are angularly displaced and the degree to which the apertures thereof are in registry is determinative of the amount of air flow through the damper.

8. A damper as set forth in claim 6, further including inner and outer skirt portions connected to the respective inner and outer damper members, the outer skirt portion guiding the movement of the inner skirt portion to maintain the respective inner and outer damper members in coaxial relationship when the damper members are moved relative to one another rotationally about the axis of the damper.

9. A damper as set forth in claim 2, further including inner and outer skirt portions connected to the respective inner and outer damper members, the outer skirt portion being sized to fit into a first duct.

10. A damper as set forth in claim 9, wherein the damper and first duct together form a damper assembly, the damper assembly being sized to fit into a second duct having a slightly larger cross section than that of the first duct.

11. A damper as set forth in claim 10, wherein the second duct comprises a flexible duct and the first duct is securely engaged therein by friction.

12. A damper as set forth in claim 1, wherein the apertures of the respective damper members are arranged in matching patterns.

13. A damper as set forth in claim 1, wherein the apertures of the respective damper members are substantially similar in shape.

14. A damper as set forth in claim 1, wherein the apertures are circular in shape.

15. A damper as set forth in claim 1, wherein when the damper members are in an open position, the respective apertures thereof align in a direction substantially perpendicular to the at least one wall of each member.

16. A damper as set forth in claim 1, wherein the damper members are frustopyramidal in shape.

17. A damper as set forth in claim 1, wherein the damper members are frustoconical in shape.

18. A damper as set forth in claim 17, wherein the axis with respect to which the respective at least one walls are inclined is coincident with the center axes of the frustoconical shape damper members.

19. A damper as set forth in claim 18, wherein the frustoconical shape damper members are relatively movable rotationally about the axis.

20. A damper as set forth in claim 18, wherein the frustoconical shape damper members are relatively movable axially along the axis.

21. A damper as set forth in claim 17, wherein the degree to which the at least one walls of the respective damper members are angularly displaced is determinative of the amount of air flow through the damper.

22. A damper as set forth in claim 21, further including an actuating assembly for relatively moving the damper members rotationally about the axis.

23. A damper as set forth in claim 21, wherein when the inclined walls are in the closed position, the apertures of the inclined wall of one of the damper members are fully blocked by the imperforate portions of the inclined wall of the other damper member.

24. A damper as set forth in claim 1, wherein the axis of the damper is defined by a direction of flow through the damper and the at least one walls of the respective damper members are relatively movable axially along the axis.

25. A damper as set forth in claim 24, wherein the axial displacement between the at least one walls of the damper members and the apertures provide a path for an amount of air flow through the damper, and wherein the degree to which the at least one walls of the respective damper members are axially displaced and the degree to which the apertures thereof are in registry is determinative of the amount of air flow through the damper.

26. A damper as set forth in claim 1, wherein the actuating assembly includes a drive member for moving one damper member relative to another damper member.

27. A damper as set forth in claim 26, wherein the actuating assembly includes a rotating drive member for rotating one damper member relative to another damper member about the axis of the damper.

28. A damper as set forth in claim 26, wherein the actuating assembly includes a reciprocating drive member for axially moving one damper member relative to another damper member along the axis of the damper.

29. A damper asset forth in claim 26, wherein the actuating assembly includes a motive source for moving the drive member to thereby cause the movement of the one damper member relative to the other damper member.

30. A damper as set forth in claim 29, wherein the motive source is a motor.

31. A damper as set forth in claim 26, wherein the drive member has opposite ends respectively disposed on opposite sides of the damper member, each end configured for attachment to a cable.

32. A damper as set forth in claim 1, further including a controller for controlling the relative movement between the damper members.

33. A damper as set forth in claim 32, further including a temperature sensor for detecting temperature of a space into which the damper conveys air and wherein the controller controls the relative movement between the damper members based on the sensed temperature.

34. A damper as set forth in claim 32, further including a pressure sensor for detecting pressure of a space into which the damper conveys air and wherein the controller controls the relative movement between the damper members based on the sensed pressure.

35. A damper as set forth in claim 29, wherein the motive source is mounted to an apex of one of the damper members.

36. A damper comprising:

a pair of damper members movable in an axial direction with respect to each other between open and closed positions, the damper members having respective funnel shaped portions each including at least one wall correspondingly inclined to an axis of the damper, the inclined wall including plural apertures separated by imperforate portions, the apertures in each wall being disposed such that the apertures of the inclined wall of one of the damper members are at least partially blocked by the imperforate portions of the inclined wall of the other damper member when the damper members are in the closed position; and an actuating assembly connected to an apex of one of the damper members for moving the damper members relative to one another wherein the pair of funnel shape damper members comprise inner and outer funnel shape damper members, the inner funnel shape damper member being disposed substantially inwardly of the outer funnel shape damper member further including inner and outer skirt portions connected to the respective inner and outer damper members, the outer skirt portion being sized to fit into a first duct, wherein the first duct includes an annular bead and the outer skirt portion includes one or more nodules which snap into the bead when the outer skirt portion is inserted into the first duct, thereby securing the outer skirt portion in engagement with the first duct.

* * * * *